United States Patent [19]

Yeager

[11] 4,396,451

[45] Aug. 2, 1983

[54] PROCESS AND ASSEMBLY FOR SEALING AN OPENING OF A PRESS

[75] Inventor: Oscar L. Yeager, Pittsburgh, Pa.

[73] Assignee: Wean United, Inc., Pittsburgh, Pa.

[21] Appl. No.: 329,353

[22] Filed: Dec. 9, 1981

[51] Int. Cl.³ .............................................. B32B 31/20
[52] U.S. Cl. .................................... 156/285; 100/211;
   100/212; 100/295; 100/382; 100/580
[58] Field of Search ............... 156/242, 245, 285, 286,
   156/288, 381, 382, 580, 583.3, 583.8, 583.91;
   100/211, 212, 219, 269 A, 278, 295

[56] References Cited

U.S. PATENT DOCUMENTS

| | | | |
|---|---|---|---|
| 3,611,482 | 10/1971 | Hutz | 425/130 |
| 3,681,171 | 8/1972 | Hojo et al. | 156/286 |
| 3,742,537 | 7/1973 | Merrill | 100/269 A |
| 3,960,635 | 6/1976 | La Roy et al. | 156/286 |
| 4,174,241 | 11/1979 | Rockar et al. | 156/286 |
| 4,290,838 | 9/1981 | Reavill et al. | 156/286 |

Primary Examiner—Caleb Weston
Attorney, Agent, or Firm—Daniel Patch; Suzanne Kikel

[57] ABSTRACT

A sealing assembly for use in a press having one or several openings defined by a number of platens, consisting of a plate to which an inflatable, flexible seal with a protective retainer is attached and is installed in the space in each opening by suspending it to the bottom side of each platen. After closing of the press, positive air pressure is delivered into the sealing element to gradually inflate the sealing element causing a tight sealing of the space between the platens irrespective of the irregularities existing in the contact surface of the sealing element. A vacuum can be applied to remove any contaminants and/or gasses trapped in the space enclosed by the sealing assembly.

8 Claims, 5 Drawing Figures

PROCESS AND ASSEMBLY FOR SEALING AN OPENING OF A PRESS

BACKGROUND OF THE INVENTION

This invention relates to a process and a sealing assembly in a multi-platen press for effecting and maintaining a proper sealing between two platens which produce and form a product irrespective of the distance between the two platens, or irregularities in the surface of the platen that would otherwise prevent sealing if conventional seals are employed. More particularly, a proper sealing is essential in a laminating press for efficiently heating and compressing several sheets of material in the laminating process.

The subject invention has particular application in multi-platen laminating presses for several stacks of laminates, however, it can easily be applied in any of several molding and forming machines used for a variety of material and having only one press opening.

Conventionally, sheets of material are stacked and inserted between two platens defining an opening in a multi-platen press. The distance between any two cooperating platens at any time defines an opening and a closing of the press. When this distance is at a maximum, a opening of the press occurs. At this time the stacked material is inserted in each of the openings between the platens. The minimum distance between the platens, and thus the closing of the press, is dictated by the height of the stacked material between the platens which may vary from stack to stack. A sealing element employed to allow a vacuum to be created extends within the platen opening and encapsulates the area surrounding the stacked material.

Presently, one form of this sealing element consists generally of an elastomeric lip which is associated with the bottom of a platen and moves with this platen and extends downwardly toward another platen cooperating therewith to form the opening. This general form has also been employed in a rubber compression molding press. Since this lip is of a one-piece construction and of a constant height, and the distance between the two cooperating platens vary in the multi-platen press, depending upon the height of the stacked material, a proper sealing around the stacked material is not always obtained. Due to this, the quality of the laminating process is impaired in not being able to pull the required vacuum rating and has proven to be inefficient with respect to the amount of energy in terms of heat and power applied when heating and compressing in the laminating process.

SUMMARY OF THE INVENTION

It is therefore an object of the present invention to provide a sealing assembly and a process for sealing which would overcome the above outlined deficiencies in the present day presses requiring an assured sealing condition.

More particularly, an object of the present invention is to obtain and maintain a tight sealing condition around the space between the platens encapsulating the material so that the environmental or ambient conditions external to the press are kept out of this area once the press is in its closed position, irrespective of the distance between two cooperating platens and irregularities existing in the contacting surface of the seal.

A still further object is to provide an inflatable sealing element constructed to expand between a minimum and maximum height depending on the material and constructural limitations of the sealing element, and wherein it would be yieldable so as to readily follow any irregularities on the surface to be sealed and yet possess a holding force to allow relatively high differential pressure conditions to be encountered.

And yet a still further object of the present invention is to provide in combination with a press having at least two cooperating platens, one of which at least is displaceable relative to the other to form an opened and a closed condition, and wherein said platens are employed to form or otherwise process material placed therebetween when in their closed position and wherein during the forming and processing of said material it is desirable to establish and maintain a sealed condition between the forming and processing area of said platens and the area external thereto; an enclosing sealing assembly having an inflatable portion and a sealing member connected to said inflatable portion, means for securing said sealing assembly to one of said platens in a manner that said sealing member is displaceable toward the other platen when said inflatable portion is inflated to enclose said forming and processing area, said other platen having a surface formed to establish a seal with said sealing member, means for inflating said inflatable portion to cause said sealing member to engage said surface of said other platen in a manner to enclose said forming and processing area so that said sealed condition can be established and maintained between said two areas.

And a further object of the present invention is to provide in a laminating press or the like having at least one movable and one cooperating platen between which maerial to be laminated is placed wherein the distance between said platens defines an opening and a closing position of said press and wherein it is desirable to obtain a sealing condition between said platens incident to the laminating operation, the steps comprising: after closing of said press applying positive air pressure into an inflatable sealing element having minimum and a maximum expansion range for expansion in a direction to occupy the distance between said platens which distance ranges between said minimum and maximum expansion range to positively seal said distance between said platens, extablishing a predetermined pressure level in the space between said material and said sealing element which level is conducive to obtaining of a desired quality of the laminated material, and controlling said establishment of said predetermined level so as to occur after said positive sealing and prior to said laminating precess.

These objects as well as other novel features and advantages of the present invention will be better appreciated and understood when the following description is read along with the accompanying drawings of which:

DESCRIPTION OF THE PREFERRED EMBODIMENT

Figure 1:
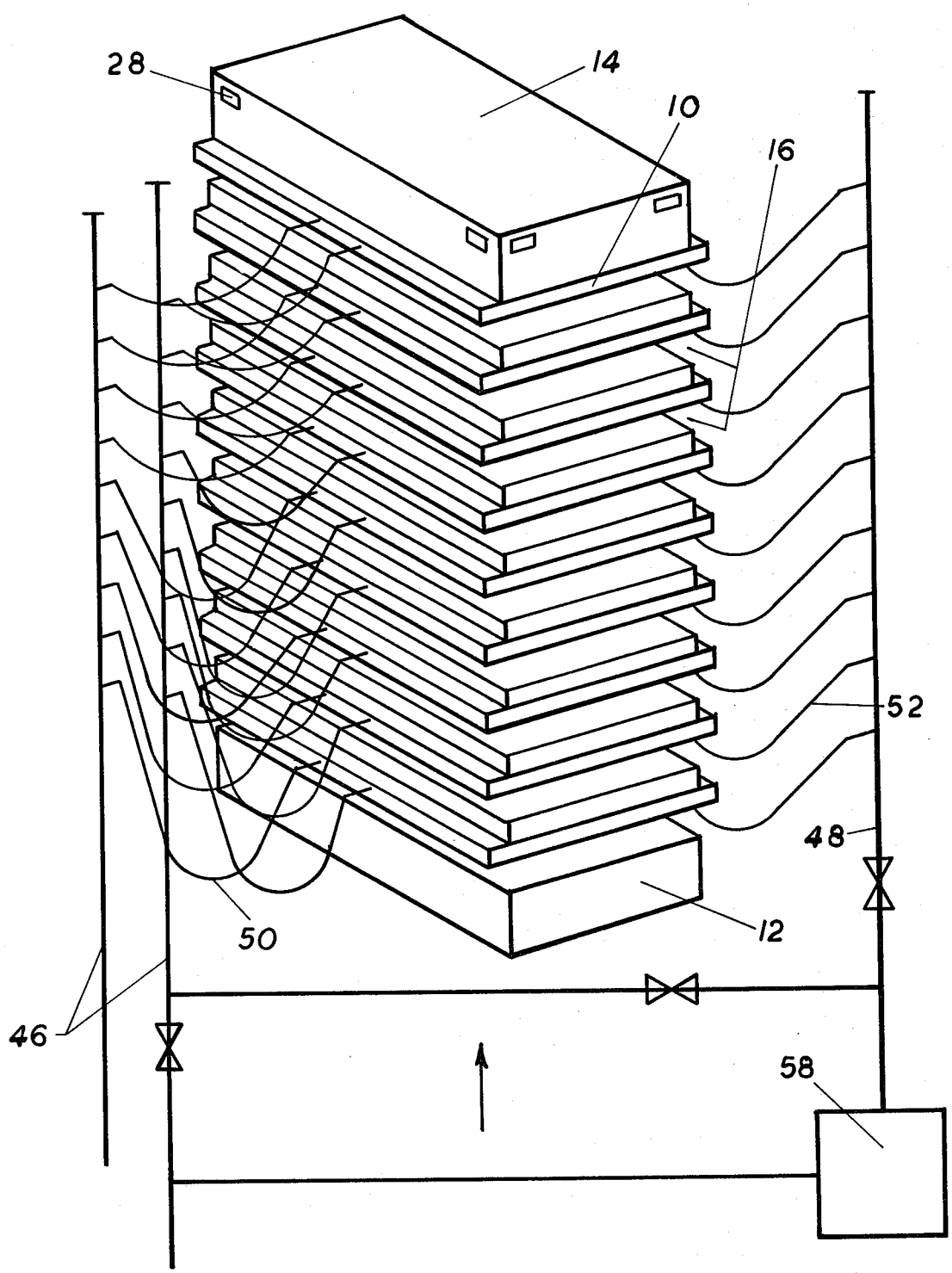
FIG. 1 is a schematic isometric view of a multi-platen press showing air pressure and vacuum lines extending to the platens.

Referring first to FIG. 1, several platens in a multi-platen press are shown which have a flat plate 10 suspended therefrom. The construction and operation of this multi-platen press is well known in the art and is similar to that disclosed in U.S. Pat. No. 3,611,482. The platens are sequentially brought together through the operation of a piston cylinder assembly, not shown, but indicated by an arrow, to move the bottom bolster 12 upwards toward the top bolster 14 in the closing of the press.

A conveyor system located alongside the press similar to that shown in the '482 patent, inserts the material between two platens when the platens are in their maximum open distance relative to each other, thereby defining an opening of the press. Two immediate adjacent platens cooperate to apply a compressive force and the required heat to the stacked material upon the closing of the press.

Figure 2:
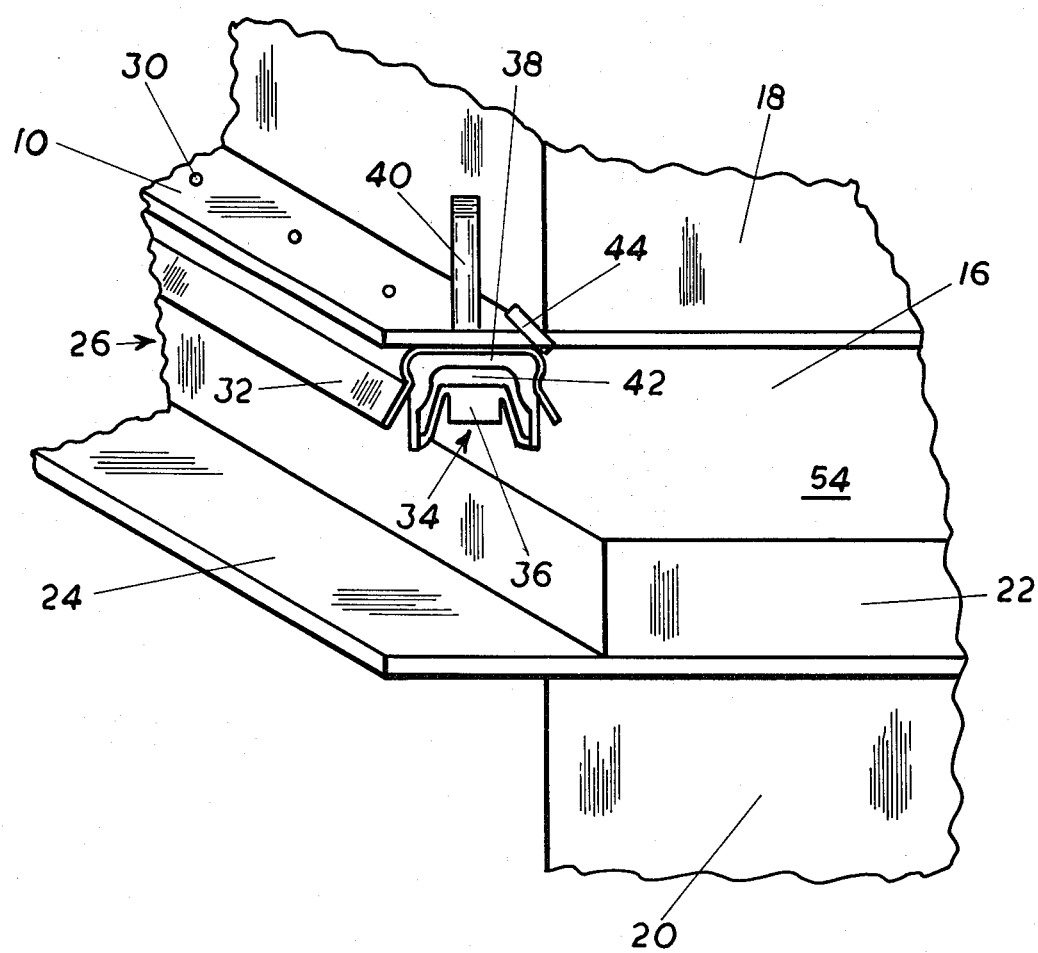
FIG. 2 is a partial isometric view of the sealing element in its deflated position in an opening of the press.
Figure 3:
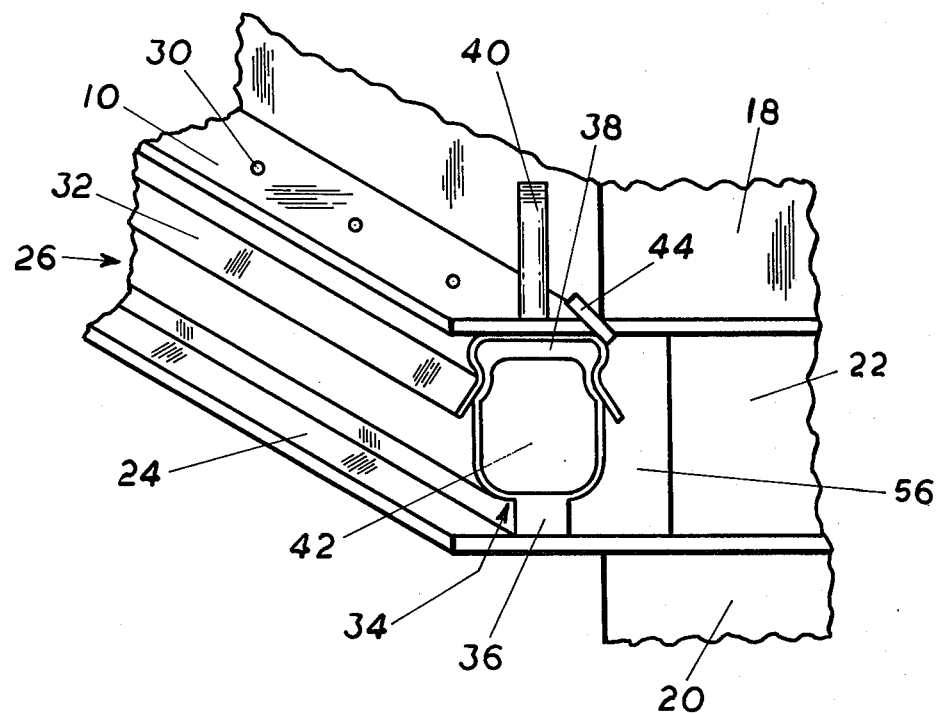
FIG. 3 is a partial isometric view of the sealing element in an inflated position in a closing of the press.

FIGS. 2 and 3 clearly illustrate the relationship of the various components in an opening 16 between two platens 18 and 20. For entrance of the material between the platens several stacks of material 22 consisting of several sheets which will form laminates are placed on a carrier plate 24. The carrier plate 24 is located between the platens 18, 20 so that the stacks of material 22 are positioned within the confines of a perimeter sealing assembly 26, more about which will be discussed shortly.

Flat rectangular plate 10, through conventional fastening means 28 shown at various points in the platens of FIG. 1, is mounted to the bottom side of a platen 18 which cooperates with platen 20 to define an opening in the press. These fastening means 28 may consist of a series of male fittings welded to the edge of the platen 18 and female fittings welded to the top of the flat plate 10. They are designed and located in such a manner to offset the effects of thermal expansion due to the heating and cooling of the platens in the laminating process. Secured to the flat plate 10 by rivets 30 so as to become a part thereof is the sealing assembly 26 as best shown in FIGS. 2 and 3. This sealing assembly 26 consists of an aluminum retainer 32 taking the form of a stylized "U" and a sealing element 34. This sealing element 34 has a striker bead or lip portion 36 and a base portion 38 having the same contour as the retainer 32. It is made of an elastomer material such as a silicone rubber compound possessing the characteristics necessary to resist heat and to withstand a specific range of air pressure applied in the laminating process, and is made to fit into the retainer 32 as shown in FIGS. 2 and 3. Inflatable sealing assembly 26 of the type disclosed is available in the trade. Air pressure line or valve stem 40 communicates with openings 42 in the sealing element 34.

Attached to this air pressure line 40 is a source of positive air pressure (not shown) ranging from 0 psig to a maximum pressure determined by the seal manufacturer and depending upon the dimensions of the sealing element 34. In communication with the opening 16 of the press is an outlet port coupling or conduit 44 in flat plate 10 located adjacent the air pressure line 40 as shown in FIGS. 2 and 3. Attached to this coupling 44 is a vacuum source (not shown) which delivers the necessary required pressure range. Schematically, in FIG. 1, the positive air and vacuum sources are indicated by air lines 46 and vacuum lines 48, respectively, from which lines 50,52 extend to each opening 16 of the press.

Figure 4:
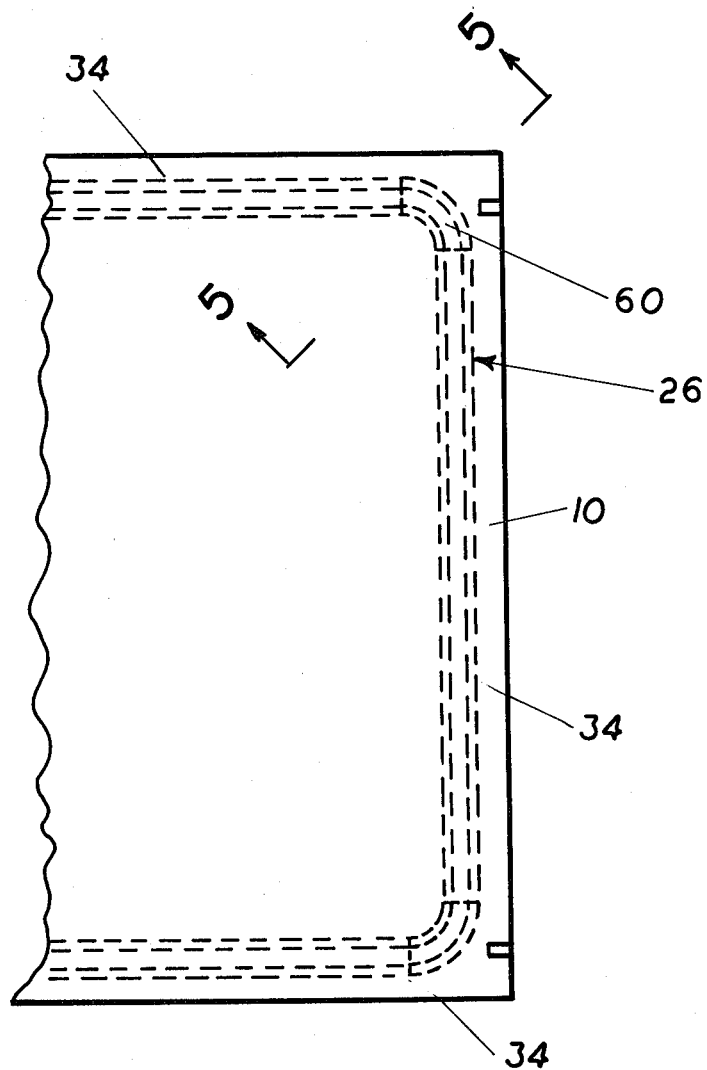
FIG. 4 is a partial enlarged plan view of the plate and sealing assembly shown in phantom.
Figure 5:
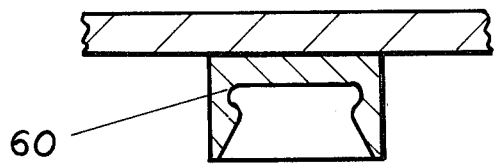
FIG. 5 is a sectional view taken along lines 5—5 of FIG. 4.

The arrangement for the sealing assembly 26 mounted on flat plate 10 is shown in FIG. 4 by the dash lines. It follows the same contour as that of flate plate 10, except for the radius configuration occurring at four corners of the sealing assembly 26. The retainer 32 along the straight sides of the sealing assembly 26 shown in FIG. 4, has the cross-section shown in FIGS. 2 and 3; however, around the four corners specially molded and machined corner retainer pieces 60 are welded to the straight sides of sealing assembly 26. The cross-section for this corner piece 60 is illustrated in FIG. 5. As can be seen it has a greater cross-section than that of the retainer portion shown in FIGS. 2 and 3. This greater cross-section provides enough rigidity to resist stress placed on the sealing element 34, as sealing element 34 is forced to change directions and is being inflated. Each corner retainer piece 60 also has an inverted "U" configuration and contour as that of retainer 32 shown in FIGS. 2 and 3 to receive base portion 38 of sealing element 34.

In briefly describing the operation of the press and more particularly the sealing assembly 26, when the press is opened, the distance between cooperating platens 16 and 20 is at its maximum as shown in FIG. 2 and the sealing element 34 is in its deflated position. The bottom bolster 12 is raised by a piston cylinder assembly indicated by an arrow in FIG. 1, and sequentially, starting with the bottom platens, brings two cooperating platens together to take up the space between the top of the stacks of material 22 and the bottom surface of the top plate 10 as shown in FIG. 3. This is done until the top last two cooperating platens of the press are brought together against the top bolster 14 therein closing the press. At this time air line 40 delivers positive air presure to inflate the seal under the required pressure which causes sealing element 34 to expand until lip portion 36 contacts the top surface of carrier plate 24 as shown in FIG. 3. At this point, constant positive air pressure is delivered into the opening 42 of sealing assembly 26 to continually maintain the established sealing condition between flat plate 10 and carrier plate 24. This expanded sealing element 34 surrounds all the stacks of material 26 between the two cooperating platens 18, 20 and creates an air space 56 around the perimeter of this stacked material 22 as shown in FIG. 3. In order to remove any contaminates, foreign matter, such as gasses, etc., from this space 56, a vacuum is pulled through coupling 44. The press is now ready for the laminating process which includes delivery of heat to the platens.

The free gas-contaminate condition existing in the space 56 enhances the quality of the laminates. If this space 56 is to contain either atmospheric pressure or above atmospheric pressure, the coupling 44 can be attached to a positive air supply source.

Due to the flexibility feature of the sealing element 34 a positive seal is assuredly created and maintained between flat plate 10 and carrier plate 24 even though neither plate may be perfectly flat and even if the height of the stacked material 22 varies within a minimum and maximum height range of the sealing element 34, which range occurs in a deflated and an inflated condition of the sealing assembly 26.

By constantly maintaining a positive seal during the laminating process cycle, a much higher depressurized or pressurized level can be maintained in space 56 encapsulated by the sealing assembly 26.

Only one arrangement of the sealing assembly is shown between two platens; however, it is to be understood that between each two cooperating platens, such a sealing assembly may be inserted. Also, positive air can be delivered to each air line, and negative air to each coupling of each sealing assembly, either simultaneously or sequentially, and the control for either time frame is done by computer control 58 shown only in FIG. 1.

In accordance with the provisions of the patent statutes, I have explained the principle and operation of my invention and have illustrated and described what I consider to represent the best embodiment thereof.

I claim:

1. In combination with a press having at least two cooperating platens, one of which at least is displaceable relative to the other to form an opened and a closed condition, and wherein said platens are employed to form or otherwise process material placed therebetween when in their closed position and wherein during the forming and processing of said material it is desirable to establish and maintain a sealed condition between the forming and processing area of said platens and the area external thereto regardless of the irregularities existing in the surface of the platen cooperating to form said sealed condition;

an enclosing sealing assembly having an inflatable portion and a sealing member connected to said inflatable portion, means for securing said sealing assembly to one of said platens in a manner that said sealing member is displaceable toward the other platen when said inflatable portion is inflated to enclose said forming and processing area, said other platen having a surface formed to establish a seal with said sealing member, means for inflating said inflatable portion including means for controlling said inflation to cause said sealing member to engage said surface of said other platen in a manner to always enclose said forming and processing area so that said sealed condition can be established and maintained between said two areas so that a desired vacuum rating can be pulled in said forming and processing area.

2. In combination with a press according to claim 1 wherein said sealing assembly further includes a retainer element having a portion for receiving a portion of said inflatable portion along substantially the entire length of the latter, and arranged to cause said sealing assembly to form said enclosure of said forming and processing area.

3. In combination with a press according to claim 2 wherein said forming and processing area and said retainer element are formed with substantially the same rectangular shape, said retainer element comprising continuous straight side portions alternating with four corner radius portions.

4. In combination with a press according to claim 2 wherein said means for securing said sealing assembly includes a rectangular plate secured to said one platen and having the same general shape of and a juxtaposed relationship with said retainer element and said inflatable portion, and means for securing said retainer element to said plate.

5. In combination with a press having at least two cooperating platens, one of which at least is displaceable relative to the other to form an opened and a closed condition, and wherein said platens are employed to form or otherwise process material placed therebetween when in their closed position and wherein during the forming and processing of said material it is desirable to establish and maintain a sealed condition between the forming and processing area of said platens and the area external thereto;

an enclosing sealing assembly having an inflatable portion and a sealing member connected to said inflatable portion, and includes a retainer element having a portion for receiving a portion of said inflatable portion along substantially the entire length of the latter, and arranged to cause said sealing assembly to form said enclosure to said forming and processing area, means for securing said sealing assembly to one of said platens in a manner that said sealing member is displaceable toward the other platen when said inflatable portion is inflated to enclose said forming and processing area, said other platen having a surface formed to establish a seal with said sealing member, means for inflating said inflatable portion to cause said sealing member to engage said surface of said other platen in a manner to enclose said forming and processing area so that said sealed condition can be established and maintained between said two areas, said retainer element formed with substantially the same rectangular shape as said forming and processing area, and comprising continuous straight side portions alternating with four corner radius portions which are substantially greater in rigidity than that of said straight side portions so as to restrain said inflatable portion of said sealing assembly.

6. In combination with a press having at least one movable and one cooperating platen between which material to be laminated and varying in height is placed, and wherein the distance between said platens defines an opening and a closing positioning of said platens, and wherein said material carried by a first plate is supported by one of said platens, a sealing assembly for creating a sealing condition between said platens, said sealing assembly comprising:

a second plate which is mounted to the other of said platens, an inflatable sealing element arranged around and carried by said second plate in a manner to be directed toward said first carrier plate, and constructed to expand in a manner to accommodate said varying height of said material and to contact said first carrier plate to always encapsulate and effectively seal an area containing said material upon movement of said platens toward each other and said closing of said press, retainer means for housing and securing said sealing element to said second plate, means for delivering positive air pressure into said inflatable seal and negative air pressure into said encapsulated area to remove certain foreign matter existing between said first and second plates including control means so that said positive air pressure is delivered at a desired time sequence relative to said closing of said press and a desired said negative air pressure is delivered upon said sealing of said area.

7. In combination with a press having at least one movable and one cooperating platen between which material to be laminated and varying in height is placed, and wherein the distance between said platens defines an opening and a closing positioning of said press, and wherein said material carried by a first plate is supported by one of said platens, a sealing assembly for creating a sealing condition between said platens, said sealing assembly comprising:

a second plate which is mounted to the other of said platens, an inflatable sealing element arranged around and carried by said second plate in a manner to be directed toward said first carrier plate, and constructed to expand in a manner to accommodate said varying height of said material and to contact said carrier plate to always encapsulate and effectively seal an area containing said material upon movement of said platens toward each other and said closing of said press, retainer means for housing and securing said sealing element to said second plate, means for obtaining a predetermind desirable pressure level in said encapsulated area, which level is conducive to obtaining a desired quality of the laminated material, including control means to establish said pressure level after said closing and said sealing of said press and prior to said laminating process.

8. In a laminating press or the like having at least one movable and one cooperating platen between which material to be laminated is placed wherein the distance between said platens defines an opening and a closing position of said press and wherein it is desirable to obtain a sealing condition between said platens incident to the laminating operation, the steps comprising:

after closing of said press applying positive air pressure into an inflatable sealing element having a minimum and a maximum expansion range for expansion in a direction to occupy the distance between said platens which distance ranges between said minimum and maximum expansion range to positively seal said distance between said platens, establishing a predetermined pressure level in the space between said material and said sealing element which level is conducive to obtaining a desired quality of the laminated material, and controlling said establishment of said predetermined level so as to occur after said positive sealing and prior to said laminating process.

* * * * *